(12) United States Patent
Vashishtha et al.

(10) Patent No.: US 10,242,033 B2
(45) Date of Patent: Mar. 26, 2019

(54) EXTRAPOLATIVE SEARCH TECHNIQUES

(71) Applicant: Adobe Inc., San Jose, CA (US)

(72) Inventors: Samartha Vashishtha, Noida (IN);
Frank Jennings, Chennai (IN)

(73) Assignee: Adobe Inc., San Jose, CA (US)

( * ) Notice: Subject to any disclaimer, the term of this patent is extended or adjusted under 35 U.S.C. 154(b) by 596 days.

(21) Appl. No.: 14/793,184

(22) Filed: Jul. 7, 2015

(65) Prior Publication Data
US 2017/0011068 A1   Jan. 12, 2017

(51) Int. Cl.
*G06F 7/00* (2006.01)
*G06F 17/30* (2006.01)

(52) U.S. Cl.
CPC .. *G06F 17/30268* (2013.01); *G06F 17/30867* (2013.01); *G06F 17/30979* (2013.01)

(58) Field of Classification Search
CPC ......... G06F 17/30268; G06F 17/30867; G06F 17/30979
See application file for complete search history.

(56) References Cited

U.S. PATENT DOCUMENTS

| | | | | |
|---|---|---|---|---|
| 8,352,465 B1* | 1/2013 | Jing | ................ | G06F 17/30867 707/723 |
| 2004/0205448 A1* | 10/2004 | Grefenstette | ....... | G06F 17/3061 715/230 |
| 2008/0140644 A1* | 6/2008 | Franks | ............. | G06F 17/30817 |
| 2011/0047163 A1* | 2/2011 | Chechik | ............ | G06F 17/30781 707/741 |

* cited by examiner

*Primary Examiner* — Tuan A Pham
*Assistant Examiner* — Thai V Dang
(74) *Attorney, Agent, or Firm* — Wolfe-SBMC

(57) ABSTRACT

Techniques for extrapolative searches are described herein. In one or more implementations, a searches are conducted using an extrapolative and additive mechanism that expands a specific query into one or more generalized queries. To do so, keywords contained in an input search query are extracted to use as a basis for a search related to content. The extracted keywords are expanded by categorization of name entities recognized from the keywords into corresponding generalized terms. Query strings to use for the search are built using combinations of keywords that are extracted from the text and corresponding generalized terms obtained by expanding the keywords. A search is conducted using the expanded queries and images results returned by the search are exposed as suggested images to represent the content.

20 Claims, 11 Drawing Sheets

500

Example A

Example B

EXTRAPOLATIVE SEARCH TECHNIQUES

BACKGROUND

Today, individuals frequently use word processors, text editors, web development tools and other applications to create and edit documents, articles, emails, and other work product. In connection with document editing, users may seek to find images to include within documents as representation of portions of text and/or themes of different paragraphs, frames, or content items. Existing tools for searching a collection of stock images are typically user driven and rely upon users' ability to craft appropriate search queries to find images on interest. Generally, though, users as well as image search engines attempt to derive very specific queries to narrow the scope of results. Additionally, users are typically not informed regarding usage rights/legal licenses associated with images obtained via the Internet. Thus, not only do existing tools require considerable effort on the part of the users, image results obtained may be limited based on overly narrow search scopes and users cannot be certain of conditions associated with use of returned images.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Techniques for extrapolative searches are described herein. The extrapolative search techniques can be implemented in connection with various applications to conduct searches for different types of content items. In one or more implementations, the techniques are employed to conduct searches for stock images to include in a document. The extrapolative search techniques uses an additive mechanism that expands a specific query into one or more generalized queries. To do so, text associated with subject content is analyzed to ascertain a theme phrase for the content. Then, keywords contained in the theme phrase are extracted to use as a basis for a search designed to find images related to the content, or other designated search results. The extracted keywords are expanded by categorization of name entities recognized from the keywords into corresponding generalized terms. Query strings to use for the search are built using combinations of keywords that are extracted from the text and corresponding generalized terms obtained by expanding the keywords. In this manner, the generalized terms are substituted for corresponding keywords in some of the query strings to expand the search scope. A search is conducted to find results related to the content using the expanded set of queries and the results of the search are exposed, such as being presented as a collection of items in a suitably configured user interface.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
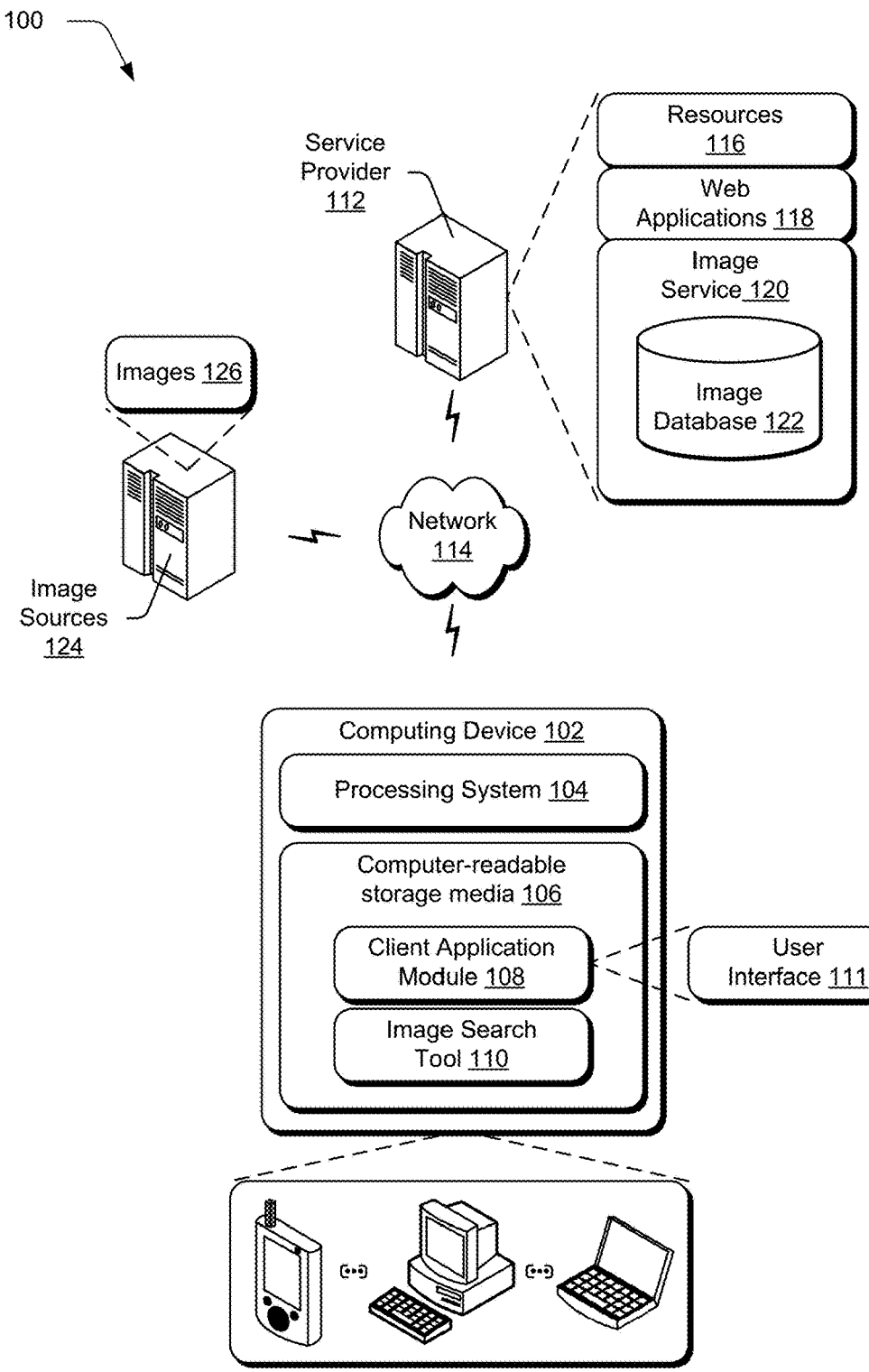
FIG. 1 is an illustration of an environment in an example implementation that is operable to employ techniques described herein.

Given input search terms for a search query, query expansion (QE) is a process used by search engines to expand the search query thereby matching additional documents. Query expansion may involve finding synonyms of words, fixing spelling errors, stemming words to derive different morphological forms, and assigning weights to search terms based on statistical analysis. Thus, query expansion relies upon a user's ability to input appropriate search terms and refinement of the input terms into corresponding terms. Expansion of a search query provides more positive results that match the expanded query, e.g., greater recall. However, greater recall comes at the expense of precision of the search results because the probability of false positive results increases with the expansion. Generally, search algorithms are designed to strike a particular balance between precision and recall.

In the case of image searches for creative content, users are typically interested in finding particular images to use within and represent the creative content. Thus, the users as well as existing image search engines attempt to derive very specific and focused queries to narrow the scope of image results. Consequently, image results obtained may be limited based on overly narrow search scopes and thereby reduce options available to users. Existing tools also require considerable effort on the part of users to initiate searches, generate the search queries, and perform actions to select an image from the results and place the selected image within a document. Additionally, users are often uncertain of licensing terms and conditions associated with the use of returned images.

Techniques for extrapolative searches are described herein. These search techniques are applicable to stock image searches as well as for other types of searches and applications, such as searches for web pages via a browser, database searches for a database application, and email searches in relation to an email client, to name a few examples. As used in this document, stock images refer to collections of image content and digital photographs that are made available via the Internet for purchase and use in commercial design of creative content. Typically, stock images are professional images that can be bought and sold through a digital marketplace on a royalty-free basis and under terms specified by the image owners. In one or more implementations, a search for stock images is conducted using an extrapolative/additive mechanism that expands a specific query into one or more generalized queries. For instance, an image search tool can be provided to enable searches for images to insert into a document. The image search tool is designed to employ the extrapolative or additive mechanism in conjunction with document creation and editing. The image search tool can be implemented as an integrated or add-in component of various types of content editing applications including word processors, a web authoring tool (an example of which is Adobe Dreamweaver™), an HTML editor, a presentation application, or a web browser to name a few examples. The image search tool can also be implemented as a web application or image service that is accessible from a service provider over a network (examples of which Adobe Fotolia™ and Adobe Stock™).

To perform extrapolative searches, text associated with content is identified as text to use for the search. The text may be identified based on an explicit user selection of text within a document. Alternatively, the text may correspond to an "active" portion of content in a document, such as a paragraph or section that is being edited, an image frame to which focus is set, text under a heading associated with a current cursor positon, and so forth. Additionally, the full text of an entire document can be employed for the analysis in some scenarios.

The identified text is analyzed to ascertain a theme phrase for the content that reflects a main concept or idea for the content. The theme phrase can be an existing topic phrase such as a title, byline, or heading already contained in the text. Alternatively, a theme phrase can be derived based on analysis of the text when an existing topic phrase is not already available. The theme phrase could also be supplied by a user as input search terms. Once a theme phrase is determined, keywords contained in the theme phrase are extracted to use as terms for a search designed to find images related to the content. Then, the extracted keywords are expanded by categorization of named entities, recognized from the keywords, into corresponding generalized terms. The named entities refer to proper name terms such as for people, geographic locations, business entities, brand names, and so forth. A defined set of generalized terms referred to as name entity categories are matched to named entities and then used as search terms in addition to the named entities thereby expanding the scope of the image search. In particular, query strings to use for the search are built using combinations of keywords that are extracted from the text and corresponding generalized terms obtained by expanding the keywords. In this manner, the generalized terms are substituted for corresponding keywords in some of the query strings to expand the search scope and return a wider set of image search results.

Accordingly, a search is conducted using the expanded set of queries to find images related to the content and images returned as results of the search are exposed as suggested images to represent the content. For example, thumbnails of images matching the set of queries can be output via a user interface that enables users to browse the results, view information for individual images such as the source and associated usage rights (e.g., attribution conditions, license terms, etc.), and select images to insert into the document. In one or more implementations, the user interface includes functionality to arrange images in groups according to usage rights and enable filtering of images based on usage rights. In this way, users can readily understand conditions associated with use of returned images and make informed decisions when selecting stock images for a project.

Extrapolative searches as described in this document enable users who produce creative content to efficiently locate and utilize stock images and other content for their projects. In at least some cases, a search tool operates to automatically search for and suggest stock images for insertion into a document based on analysis of relevant text. Accordingly, the searches can occur without a user having to provide input terms for the search. Further, image search results are exposed via an application user interface in real-time as a user creates content and can be updated dynamically during editing. Consequently, a user is able to focus on content creation and does not have to expend time and energy to manually locate stock images or provide input terms for the search. Additionally, categorization to substitute named entities with corresponding generalized terms expands the scope of the search to include appropriate named entity categories. By doing so, a wider set of relevant image search results are obtained and the user is provided with more options for their creative projects.

In the following discussion, an example environment is first described that may employ the techniques described herein. Example procedures and implementation details are then described which may be performed in the example environment as well as other environments. Consequently, performance of the example procedures and details is not limited to the example environment and the example environment is not limited to performance of the examples procedures and details.

Example Environment

FIG. 1 is an illustration of an environment 100 in an example implementation that is operable to employ techniques described herein. The illustrated environment 100 includes a computing device 102 including a processing system 104 that may include one or more processing devices, one or more computer-readable storage media 106 and a client application module 108 embodied on the computer-readable storage media 106 and operable via the processing system 104 to implement corresponding functionality described herein. In at least some embodiments, the client application module 108 may represent a browser of the computing device operable to access various kinds of web-based resources (e.g., content and services). The client application module 108 may also represent a client-side component having integrated functionality operable to access web-based resources (e.g., a network-enabled application), browse the Internet, interact with online providers, and so forth.

The computing device 102 may also include or make use of an image search tool 110 that represents functionality operable to implement techniques for extrapolative stock image searches as described above and below. For instance, the image search tool 110 is operable to access and utilize various available source of images to find candidate images that match query terms. The image search tool 110 further represents functionality to perform various actions to facilitate query generation and expansion of keywords as discussed herein, such as analysis to derive theme phrases, text analytics to derive keywords to use as search terms, named entity recognition, and/or construction of queries, to name a few examples. In general, the image search tool 110 is configured to search for and suggest stock images for insertion into a document based on analysis of relevant text and without a user having to provide input terms for the search. Images that are discovered based on images searches conducted via the image search tool 110 may be exposed via a user interface 111 output by a client application module 108 or another application for which the image search tool 110 is configured to provide functionality for extrapolative stock image searches.

The image search tool 110 may be implemented as a software module, a hardware device, or using a combination of software, hardware, firmware, fixed logic circuitry, etc. The image search tool 110 may be implemented as a standalone component of the computing device 102 as illustrated. In addition or alternatively, the image search tool 110 may be configured as a component of the client application module 108, an operating system, or other device application. For example, image search tool 110 may be provided as a plug-in and/or downloadable script for a browser. image search tool 110 may also represent script contained in or otherwise accessible via a webpage, web application, or other resources made available by a service provider.

The computing device 102 may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 11.

The environment 100 further depicts one or more service providers 112, configured to communicate with computing device 102 over a network 114, such as the Internet, to provide a "cloud-based" computing environment. Generally, speaking a service provider 112 is configured to make various resources 116 available over the network 114 to clients. In some scenarios, users may sign-up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services and/or content typically made available over a network by one or more providers. Some examples of services include, but are not limited to, a photo editing service, a web development and management service, a collaboration service, a social networking service, a messaging service, an advertisement service, and so forth. Content may include various combinations of text, video, ads, audio, multi-media streams, animations, images, web documents, web pages, applications, device applications, and the like.

Web applications 118 represent one particular kind of resource 116 that may be accessible via a service provider 112. Web applications 118 may be operated over a network 114 using a browser or other client application module 108 to obtain and run client-side code for the web application. In at least some implementations, a runtime environment for execution of the web application 118 is provided by the browser (or other client application module 108). Thus, service and content available from the service provider may be accessible as web-applications in some scenarios.

The service provider is further illustrated as including an image service 120 that is configured to provide an image database 122 in accordance with techniques described herein. The image service 120 may operate to search different image sources 124 and analyze and curate images 126 that are available from the usage sources to produce the image database 122. The image database 122 is representative of a server-side repository of curated images that may accessed by clients to insert into web pages, word documents, presentations, and other content. The image service 120, for example, may be configured to provide clients/applications access to utilize the image database 122 via respective image search tools 110. The image service 120 can also collect, associate, and/or manage usage right data with images 126, such as attribution conditions, license terms, usage fees, and other conditions associated with using images. Accordingly, images in the database can be sorted and filtered based on different usage rights and searches can specify a particular rights of interest as search criteria. In this approach, the image service 120 handles searching across multiple sources on behalf of clients and produces a collection of pre-searched, curated, and sorted/filtered images that the clients can utilize for stock image selection. In addition or alternatively, image search tools 110 deployed to clients can be configured to interact directly with image sources 124 corresponding to multiple different providers to obtain images using extrapolative stock image search techniques discussed herein, with or without the assistance of the image service 120.

Having considered an example environment, consider now a discussion of some example details of techniques for extrapolative stock image searches in accordance with one or more implementations.

Extrapolative Stock Image Search Details

This section describes some example details of extrapolative stock image searches in accordance with one or more implementations in relation to some example procedures, scenarios, and user interfaces of FIGS. 2-10. The procedures discussed herein are represented as sets of blocks that specify operations performed by one or more devices and are not necessarily limited to the orders shown for performing the operations by the respective blocks. Aspects of the procedures may be implemented in hardware, firmware, or software, or a combination thereof. Some aspects of the procedures may be implemented via one or more servers, such as via a service provider 112 that maintains and provides access to an image database 122 via an image service 120 or otherwise. Aspects of the procedures may also be performed by a suitably configured device, such as the example computing device 102 of FIG. 1 that includes or makes use of an image search tool 110 and/or a client application module 108.

Extrapolative Stock Image Search

Figure 2:
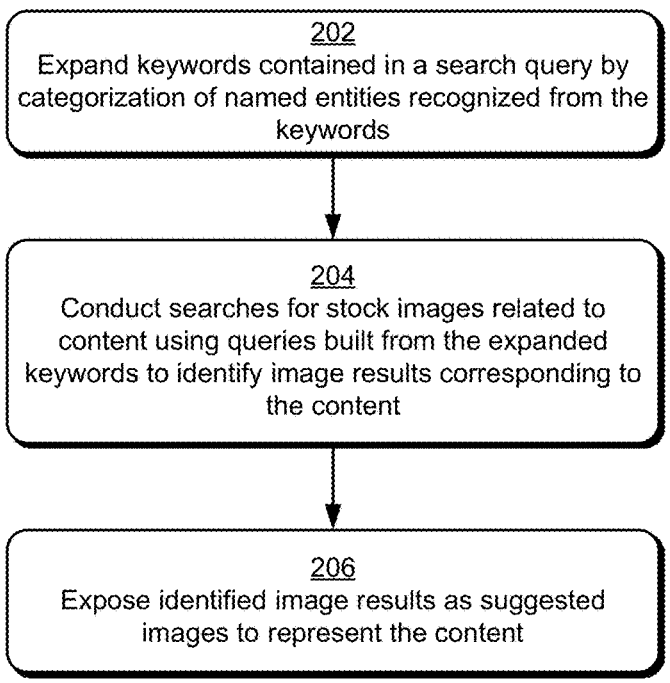
FIG. 2 is a flow diagram depicting an example procedure to search for stock images in accordance with one or more implementations.

FIG. 2 is a flow diagram depicting an example procedure 200 to search for stock images in accordance with one or more implementations. As noted, a stock image search can occur in relation to editing of a document such as a web page or word processing document. An image search tool 110 can be invoked to insert an image at a designated location in the document, such as in association with a paragraph, in connection with a portion of text for the document, or in relation to an image frame. Selection of a button, menu item, or other suitable control to add an image can initiate an extrapolative stock image search in the manner discussed herein. In particular, the image search tool 110 can automatically perform the search based on text analytics and, at least in some cases, without a user having to input any search terms for the search.

To conduct a search, keywords contained in a search query are expanded by categorization of named entities recognized from the keywords (block 202). Categorization involves deriving generalized terms for named entities in the search query that are then used in addition to, or in place of, the named entity terms. The categorization to expand a query can occur in any suitable way. In one approach, a collection of named entity categories are defined that can be used to substitute for or expand named entities in queries. In particular, the named entity categories specify the generalized terms to use for named entities, such as for names of people, geographic locations, business entities, brand names, and so forth. By way of example, the name "Bob" can be matched to "person" and the name "Nile" can be matched to "river" and "water". Accordingly, expansion of the keywords may involve recognizing one or more named entities indicated by the keywords and determining generalized terms for the named entities as specified by the collection of named entity categories.

In one or more implementations, name entities are recognized by breaking the search query into parts of speech (POS) and identifying named entities for subjects and objects indicated by the parts of speech (POS). The named entities are then categorized by matching the named entities to generalized terms reflected by the collection of named entity categories supported by the system. Searches can be based upon both the extracted keywords and expanded generalized terms, which increases the scope of the search. Details regarding these and other aspects of named entity recognition and categorization are described in relation to the discussion of FIGS. 3-5 that follows.

A search query can be obtained in various ways. For example, the search query can be supplied by a user via a search input control provide via the image search tool 110 or other application. In addition or alternatively, the search query can be automatically generated based on text analytics of content associated with the search. By way of example, text analysis to generate a corresponding search query can occur in relation to content in a portion of a document that is recognized as being associated with the location at which an image is to be added to the document. In this approach, the search query is established automatically based on the context of the content and without a user having to input search terms. Recognition of relevant portions of a document may be based on a cursor position, an explicit selection of text, proximity to an image frame in the document, or other assessment of text that is relevant for the purposes of a search or stock image selection. Once appropriate text is identified, the text can be analyzed in various ways to derive a search query.

In one or more implementations, the search query is generated as a theme phrase for the content. Generation of a theme phrase involves analyzing text associated with relevant content to ascertain a main idea or concept reflected by the text. Once a theme phrase is arrived at, keywords that are contained in the theme phrase are extracted to use for an image search. For example, the image search tool 110 can implement a tokenizer operable to parse the theme phrase into constituent words and fragments. The image search tool 110 can also implement a parts of speech analyzer to recognize parts of speech for words that make up the theme phrase. Processing of the theme phrase returns a set of keywords that are extracted directly from the theme phrase.

A theme phrase for subject text/content can be determined in any suitable way. In one approach, the text is analyzed to determine if the text includes an existing topic phrase that is already associated with the text. Sources of existing topic phrases can include a title, byline, section header, topic sentence, or even metadata fields that describe the theme of the content. If an existing topic phrase is discovered, the existing topic phrase is selected as the theme phrase to use for the stock image search.

A theme phrase can also be derived directly from the text in some scenarios. For example, theme phrase derivation through text analytics can occur responsive to a determination that an existing topic phrase is unavailable. Alternatively, the system can be configured to perform theme phrase derivation in lieu of performing analysis to check for an existing topic phrase. For example, settings for the image search tool 110 can be configured to specify whether to use existing topic phrase analysis individually, theme derivation individually, or existing topic phrase analysis and theme phrase derivation in combination to determine theme phrases. Generally, theme phrase derivation involves deriving a theme phrase based in part upon analysis to discover constituent phrases of the text that contain words identified as being used most frequently (e.g., the most relevant words) within both the text and a set of documents recognized as having similarity with the content. Thus, theme phrase derivation relies not only upon the subject document, but also upon analysis of external documents considered to be similar to the subject document. Details regarding theme phrase derivation techniques that may be employed in various implementations can be found in relation to the discussion of FIGS. 6 and 7 below.

Following expansion of a search query in the manner discussed, searches for stock images related to content are conducted using queries built from the expanded keywords to identify image results corresponding to the content (block 204). Then, identified images are exposed as suggested images to represent the content (block 206). For example, an expanded set of search queries can be generated using both query strings constructed based on combinations of terms for the input query text (e.g., search query or theme phrase) and query strings constructed based on combinations of terms in the input query text having named entities replaced with corresponding generalized terms. In addition, verbs contained in the keywords can be lemmatized and search queries can be expanded by using different forms of the verbs derived by lemmatization.

The queries built using the expanded keywords are employed to conduct the searches for stock images. As discussed previously, an image search may involve accessing and searching images contained in an image database 122 exposed via an image service 120 accessible via a service provider 122. In addition or alternatively, the image search may involve searching images 126 across multiple different image sources 124.

Once image results matching the expanded keywords and queries are obtained, the image results may be exposed in various ways to facilitate browsing, review, and selection of the images by user. A selected image can automatically be inserted within the content at a designated location that corresponds to text used to determine the search, query, theme phrase and/or keywords. By way of example, identified images may be exposed by outputting a user interface 111 for image selection having an arrangement of multiple images returned as search results for the image search. The user interface 111 may correspond to a client application module 108 used to create the content, examples of which were previously discussed. Additionally, the user interface may include filter functionality operable to filter the arrangement of multiple images based on usage rights associated with the multiple images. This enable filtering and grouping of images in the user interface 11 in accordance with usage rights. Information regarding usage rights, image sources, and other metadata for the images may also be exposed along with the images in various ways, such as via a metadata element that is populated with data for a selected image, pop-up boxes accessible by placement of a cursor proximate to an image, or rendering of metadata along with the images via borders of the images. The user interface additionally includes functionality operable to select and automatically insert one of the multiple images to represent the text at a location within the content corresponding to the text. For example, a selection button or other control can be configured to add a selected image. Other selection techniques are also contemplated, such as by using a double-click, gesture, or other designated action to cause image insertion.

Name Entity Recognition and Categorization

Figure 3:
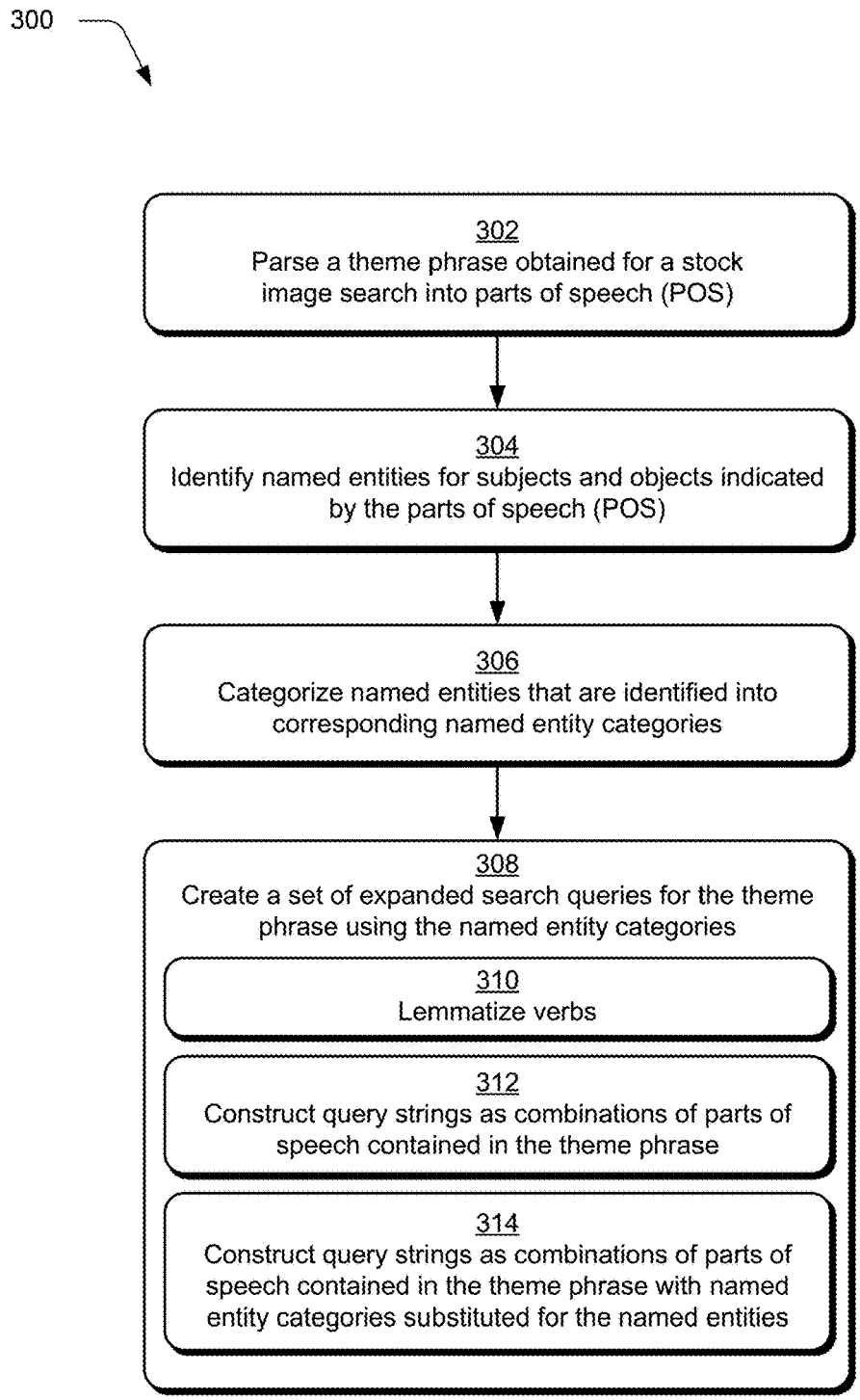
FIG. 3 is flow diagram depicting an example procedure to expand search queries using named entity categories to generalize keywords in accordance with one or more implementations.
Figure 4:
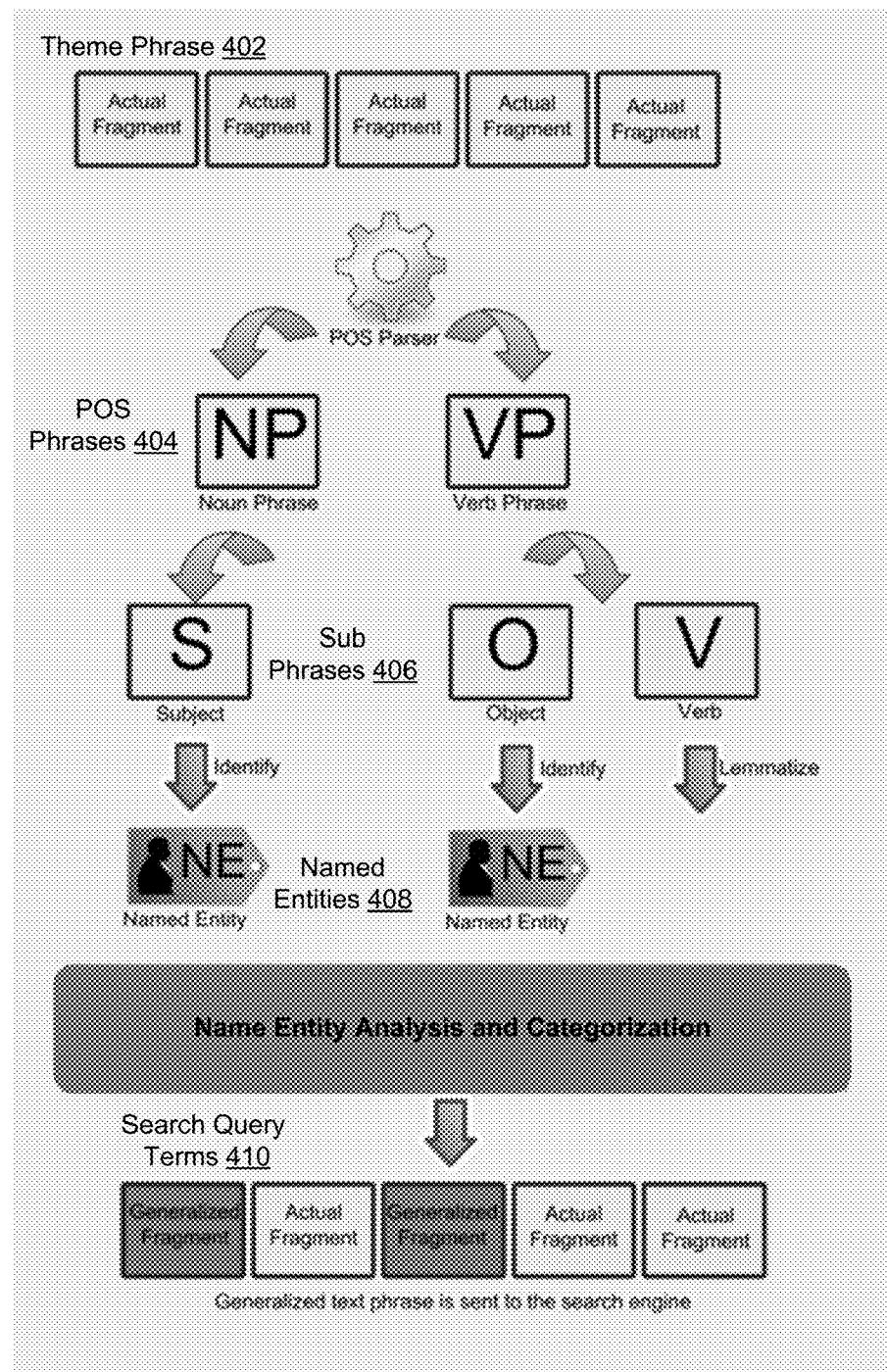
FIG. 4 is a diagram depicting an example representation of name entity analysis and categorization in accordance with one or more implementations.
Figure 5:
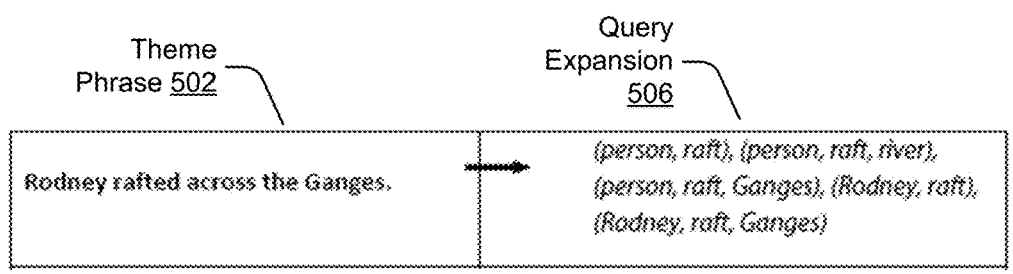
FIG. 5 is a diagram depicting examples of query expansion for theme phrases in accordance with one or more implementations.
Figure 5:
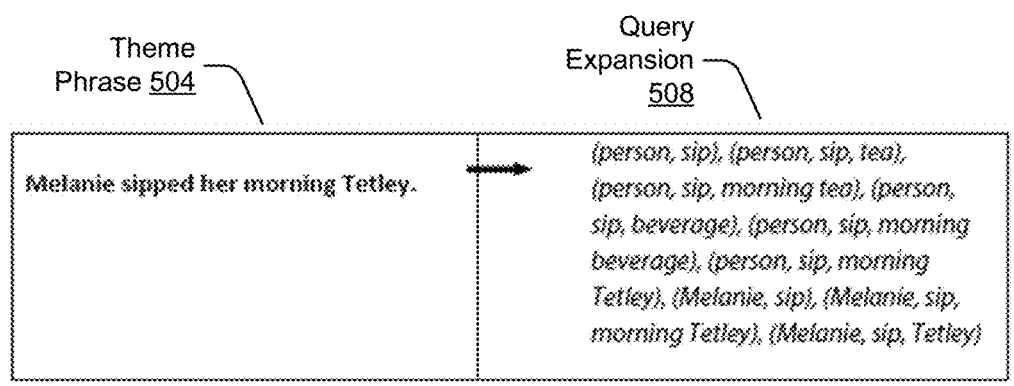

Details regarding name entity recognition and categorization are described in this section in relation to FIGS. 3-5. FIG. 3 is flow diagram depicting an example procedure 300 to expand search queries using named entity categories to generalize keywords in accordance with one or more implementations. The procedure can be implemented by way of an image search tool 110 that is provided via a client application module, as part of an image service 120, or otherwise. Expansion of search queries is implemented via an extrapolative/additive mechanism that includes name entity recognition and categorization as discussed herein. The procedure 300 provides an example technique that can be employed in various contexts including in conjunction with the example procedure 200 of FIG. 2.

In particular, a theme phrase obtained for a stock image search is parsed into parts of speech (block 302). A theme phrase can be obtained based on an existing topic phrase or by applying a theme phrase derivation algorithm as discussed above and below. Then, a parts of speech POS parser performs analysis on fragments of the theme phrase to break the theme into parts of speech phrases. The parts of speech phrases can include noun phrases and verb phrases. Search queries other than theme phrases are also contemplated and can such queries can be expanded and utilized in a comparable manner as described in relation to theme phrases Named entities are identified for subjects and objects indicated by the parts of speech (POS) (block 304). For example, noun phrases obtained from parsing of the theme can be further processed into sub-phrases to determine a subject or subjects for the theme. Likewise, the verb phrases can be broken down into object and verb sub-phrases. The subjects and objects that are determined are further analyzed to identify any named entities through named entity recognitions. This may occur by comparison of words to a dictionary of known words and/or entity names. Words can be characterized as being name entities if the words are not in the list of known words, or if the words are contained in the list of known entity names.

Named entities that are identified are categorized into corresponding named entity categories (block 306). As noted, the image search tool 110 can include or make use of a set of named entity categories that are configured to generalize corresponding named entities. Name entity categorization involves matching of specific terms to general terms reflected by the named entity categories established for the system. Each named entity can be mapped to one or more corresponding named entity category, such as associating "Spokane" with "city" and "Atlantic" to "ocean," to name a few examples.

A set of expanded search queries is created for the theme phrase using the named entity categories (block 308). For instance, the expanded search queries are generated by using the general terms in addition to or in lieu of the specific terms as search criteria for the queries. This serves to expand the scope of the search and return more image options as results of the search. To create the expanded queries, verbs contained in the theme phrase are lemmatized (block). Lemmatization involves finding the root or dictionary form of a verb (e.g., the lemma). For example, "jumped" is lemmatized to "jump" and "kicks" is lemmatized to "kick." Query strings are then built using combinations of the terms in the theme phrase with forms of the verbs. This includes constructing query strings as combinations of parts of speech contained in the theme phrase (block 312) and constructing query strings as combinations of parts of speech contained in the theme phrase with named entity categories substituted for the named entities (block 314). Thus, various different combinations of the keywords are enumerated to produce the query strings for the image search that are much broader in comparison to using just the terms contained in the original theme phrase.

FIG. 4 is a diagram depicting generally at 400 an example representation of named entity analysis and categorization in accordance with one or more implementations. In particular, FIG. 4 is a diagrammatic representation of the procedure 300 discussed in relation to FIG. 3. As depicted in FIG. 4, an input theme phrase 402 having multiple words or fragments is fed into a parser that breaks the theme phrase down into parts of speech phrases 404. The parts of speech phrases 404 are in turn divided into sub-phrases 406 indicative of subjects, objects, and verbs for the theme. The verbs can be lemmatized and the subjects and objects used to identify named entities 408 in accordance with techniques described herein. Named entities 408 are analyzed and categorized using generalized terms defined by a set of named entity categories. Then, search query terms 410 are derived that include combinations of both the specific terms/fragments of the input theme phrase 402 and the generalized terms matched to named entities.

To further illustrate, consider FIG. 5 that is a diagram depicting generally at 500 examples of query expansion for theme phrases in accordance with one or more implementations. In particular, examples A and B illustrate example theme phrases 502, 504 along with corresponding query expansions 506, 508 produced using named entity recognition and categorization as discussed herein. For instance, the theme phrase 502 in example A includes the words "Rodney rafted across the Ganges." Named entity recognition can be applied to identify the named entities "Rodney" and "Ganges." Through categorization, "Rodney" can be associated with a named entity category "person" and "Ganges" with a named entity category "river." Additionally, "rafted" is lemmatized to "raft. Query strings for an image search are then formed by enumerating different combinations of the terms including combinations that substitute the general named entity category for the more specific named entities, as reflected by the example query expansion 506.

Likewise, the theme phrase 504 in example B includes the words "Melanie sipped her morning Tetley." Named entity recognition can be applied to identify the named entities "Melanie" and "Tetley." Through categorization, "Melanie" can be associated with a named entity category "person" and "Tetley" with a named entity categories "beverage" and/or "tea." Additionally, "sipped" is lemmatized to "sip". Query strings for an image search are again formed by enumerating different combinations of the terms including combinations that substitute the general named entity category for the more specific named entities, as reflected by the example query expansion 508.

Theme Phrase Derivation

Figure 6:
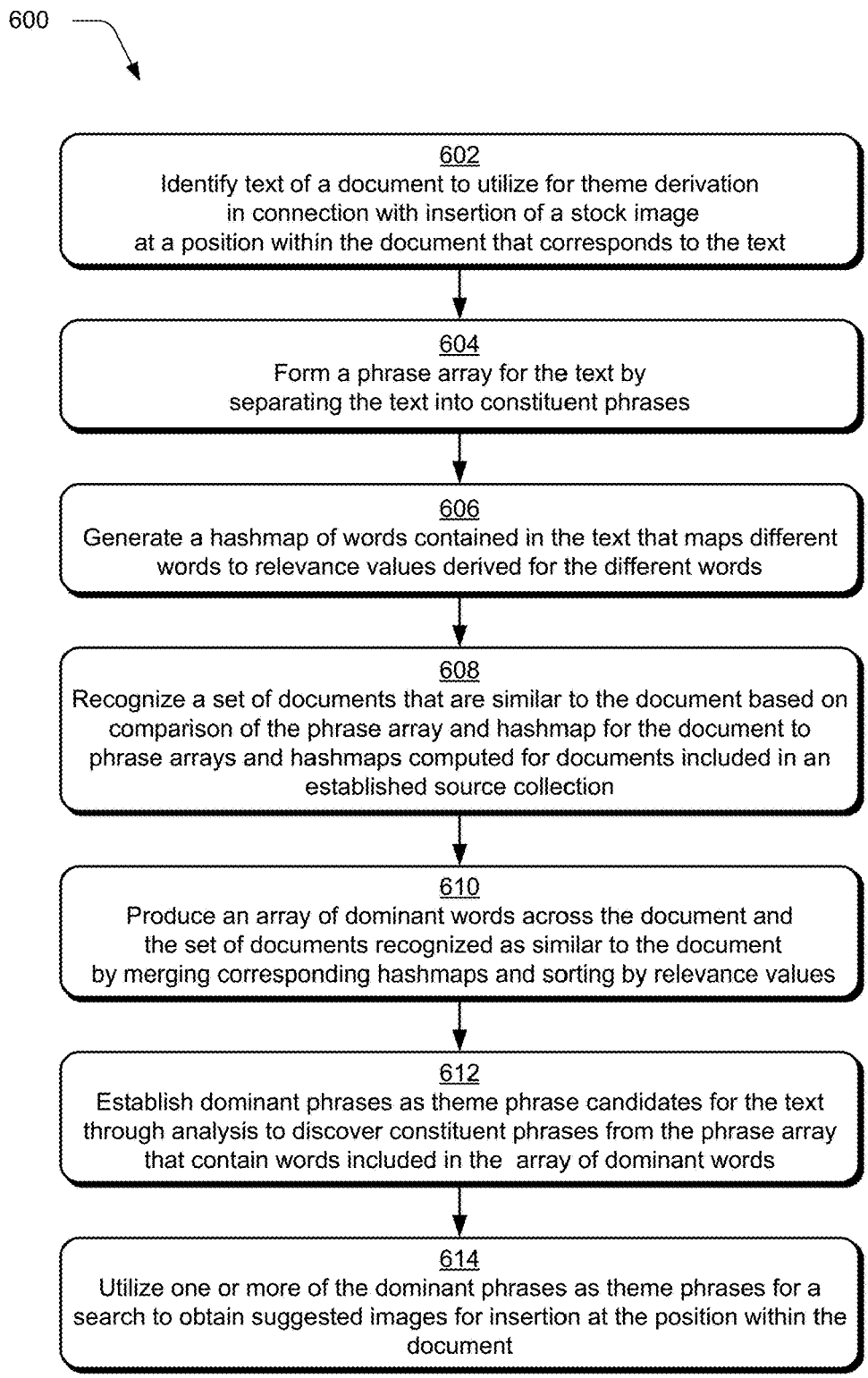
FIG. 6 is a flow diagram depicting an example procedure for theme phrase derivation in accordance with one or more implementations.
Figure 7:
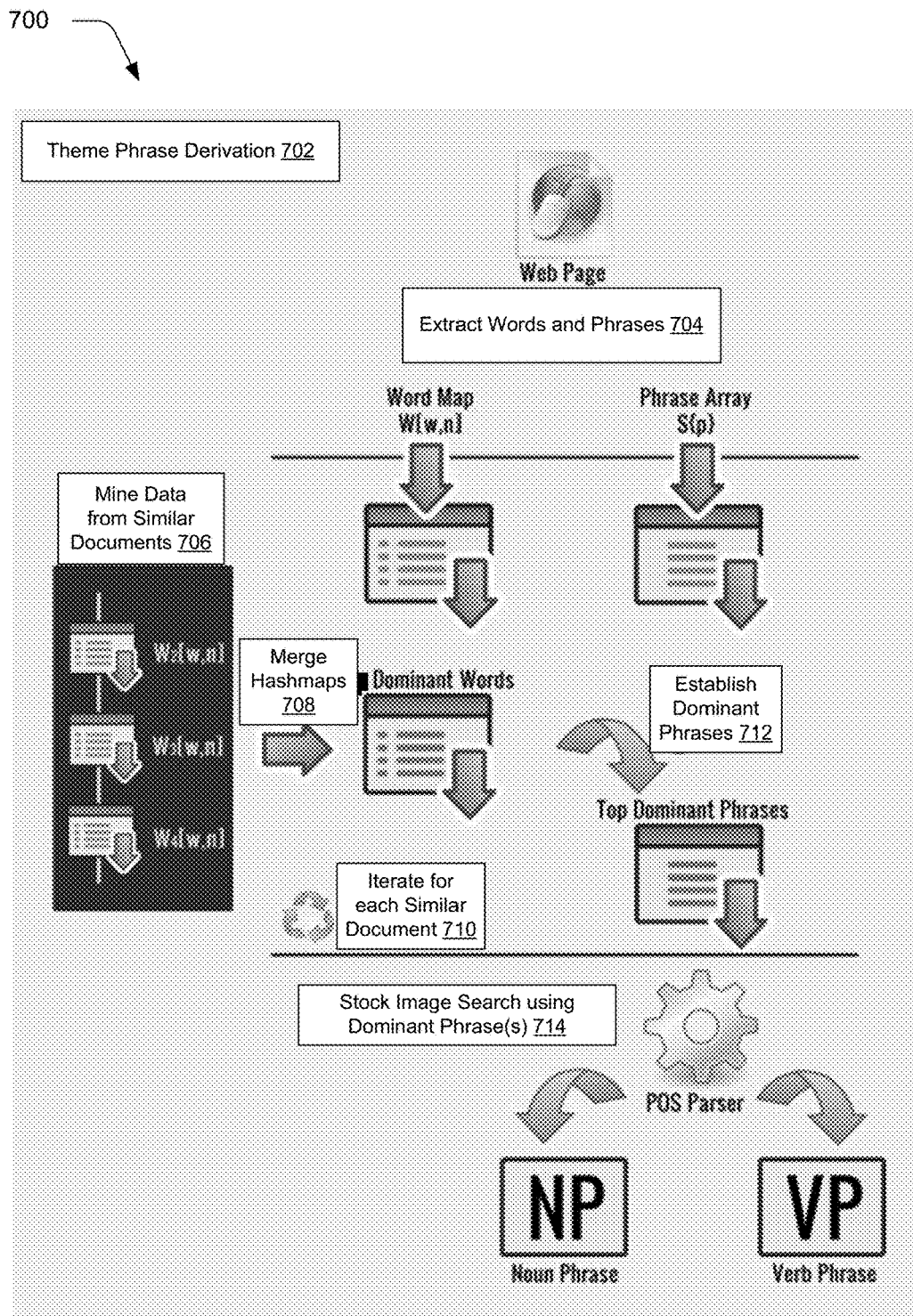
FIG. 7 is a diagram depicting an example scenario for theme derivation in accordance with one or more implementations.

Details regarding theme phrase derivation are described in this section in relation to FIGS. 6-7. FIG. 6 is a flow diagram depicting an example procedure 600 for theme phrase derivation in accordance with one or more implementations. Theme phrases are derived to represent the main idea or concept reflected by the text. Theme phrase derivation occurs through text analytics to discover the main idea or concept. As noted, the theme phrase derivation as discussed herein can rely upon analysis of the target text as well as analysis of documents that are considered similar to the target text. The similar documents may be those within the same domain or collection. In addition or alternatively, documents available from external sources (outside domains and different collections) may be used when the external sources are designated as having the same or similar types of content. The example procedure 600 for theme phrase derivation can be employed in various contexts including in conjunction with the example procedures 200 and 300 of FIGS. 2 and 3.

Text of a document is identified to utilize for theme derivation in connection with insertion of a stock image at a position within the document that corresponds to the text (block 602). For example, selected text or text that is proximate to an image frame or cursor location may be identified as relevant text for a stock image search when a search is initiated. In some cases, an entire document or content item can be used for theme derivation, such as for a small on-line ad or social network post.

A phrase array is formed for the text by separating the text into constituent phrases (block 604). For instance, a sentence/phrase tokenizer can operate to split the text into an array of valid sentences and phrases. In addition, a hashmap of words contained in the text is generated that maps different words to relevance values derived for the different words (block 606). This can occur through operation of a word tokenizer to recognize different unique words contained in the text. Additionally, relevance values are mapped to words in the array. The relevance values can reflect scores indicative of the relative importance of words in the text. Relevance values are derived using known statistical analysis techniques to analyze one or more of usage in individual documents, a usage history for the user, and known usage statistics across a collection of documents and users. By way of example, relevance values can be based on the frequency of occurrence, weighted word scores, and/or other suitable relevance metrics typically used to assess the importance of words within text. Words can be sorted and ranked in the hashmap according to the relevance scores.

A set of documents is recognized that is similar to the document based on comparison of the phrase array and hashmap for the document to phrase arrays and hashmaps computed for documents included in an established source collection (block 608). In other words, a similarity assessment is made between the subject document and other documents from an established source collection. The established source collection can include documents contained within at least one of the same domain as the document or external domains designated as having content that similar to the document. To assess similarity, phrase arrays and hashmaps are computed for potentially similar documents and compared to the ones generated for the subject document. If the comparison results in positive output, i.e. the phrase arrays and hashmaps of a potentially similar document match with the phrase arrays and hashmaps of the subject document, then the potential similar document is considered to be similar to the subject document. Similarity scores for the documents can be determined according to the comparison and the documents can then be ranked based in order of similarity. A designated number of external documents to use for the analysis is defined and the top ranking documents are used to populate a collection of similar documents.

An array of dominant words across the document and the set of documents recognized as similar to the document is produced by merging corresponding hashmaps and sorting by relevance values (block 610). In particular, elements in the hashmaps are grouped and sorted to produce a combined array of dominant words. The array of dominant words includes elements from the various hashmaps that are ranked according to frequency or other relevance values. The combined array of dominant words is populated with top ranking words from the hashmaps until a defined threshold number of words have been added to the array. This process ensures that noisy words that have some relevance to an individual document but may have little significance across multiple similar documents are pushed down in the rankings in favor of words used more consistently across multiple similar documents.

Having generated the array of dominant words, dominant phrases are established as theme phrase candidates for the text. This occurs through analysis to discover constituent phrases from the phrase array that contain words included in the array of dominant words (block 612). In particular, elements of the dominant word array can be superimposed over elements in the phrase array to discover phrases having instances of words from the dominant word array. Phrases can be scored and ranked according to the relevance values that are used to rank words in the dominant word array.

Then, top ranking phrases are selected as dominant phrases, and one or more of the dominant phrases are utilized as theme phrases for a search to obtain suggested images for insertion at the position within the document (block 614). For example, if the dominant word array includes the words "Football" and "Green Bay" at, or near to, the top of the rankings in the dominant word array, a phrase in the phrase array that includes these words, such as "Green Bay's Aaron Rogers is football's top passer," will score highly and be selected as a dominant phrase. In one approach, any phrases that achieve a threshold score are selected as dominant phrases and used for the search to give a wide choice of relevant stock art. In addition or alternatively, a configurable number of phrases to employ for a search can be set (e.g., one or more top ranking phrases), in which case the specified number of phrases are selected based on rankings and returned for use in the search. Thus, a stock image search can be based upon one or more theme phrases that are derived using the process for theme phrase derivation as just discussed. The stock image search can occur in the manner described previously, which includes applying named entity recognition and categorization to the theme phrases.

FIG. 7 is a diagram depicting generally at 700 an example scenario for theme phrase derivation in accordance with one or more implementations. In particular, FIG. 7 is a diagrammatic representation of the procedure 600 discussed in relation to FIG. 6. As depicted in FIG. 7, theme phrase derivation 702 is applied to a representative document in the form of a web page. As discussed in relation to procedure 600, words and phrases are extracted from the web page to form a hashmap of words W{w,n} and a phrase array S{p} as represented at 704. Data is mined from similar documents at 706, which involves producing hashmaps of words $W_x${w, n} for each document and merging with the hashmap W{w,n} at 708 to form the dominant word array. Formation of a combined dominant word array may occur as multiple step process in which the hashmap creation and merging occurs iteratively for each similar document as represented at 710. Then, dominant phrases are established as indicated at 712. This occurs by ascertaining constituent phrases from the phrase array S{p} that contain words included in the array of dominant words. Generally, scores indicative of relevance are generated for each candidate phrase and one or more top ranking phrases are selected to use for the image search. Then, a stock image search is conducted using the dominant phrases that are selected as denoted at 714.

Example User Interfaces

Figure 8:
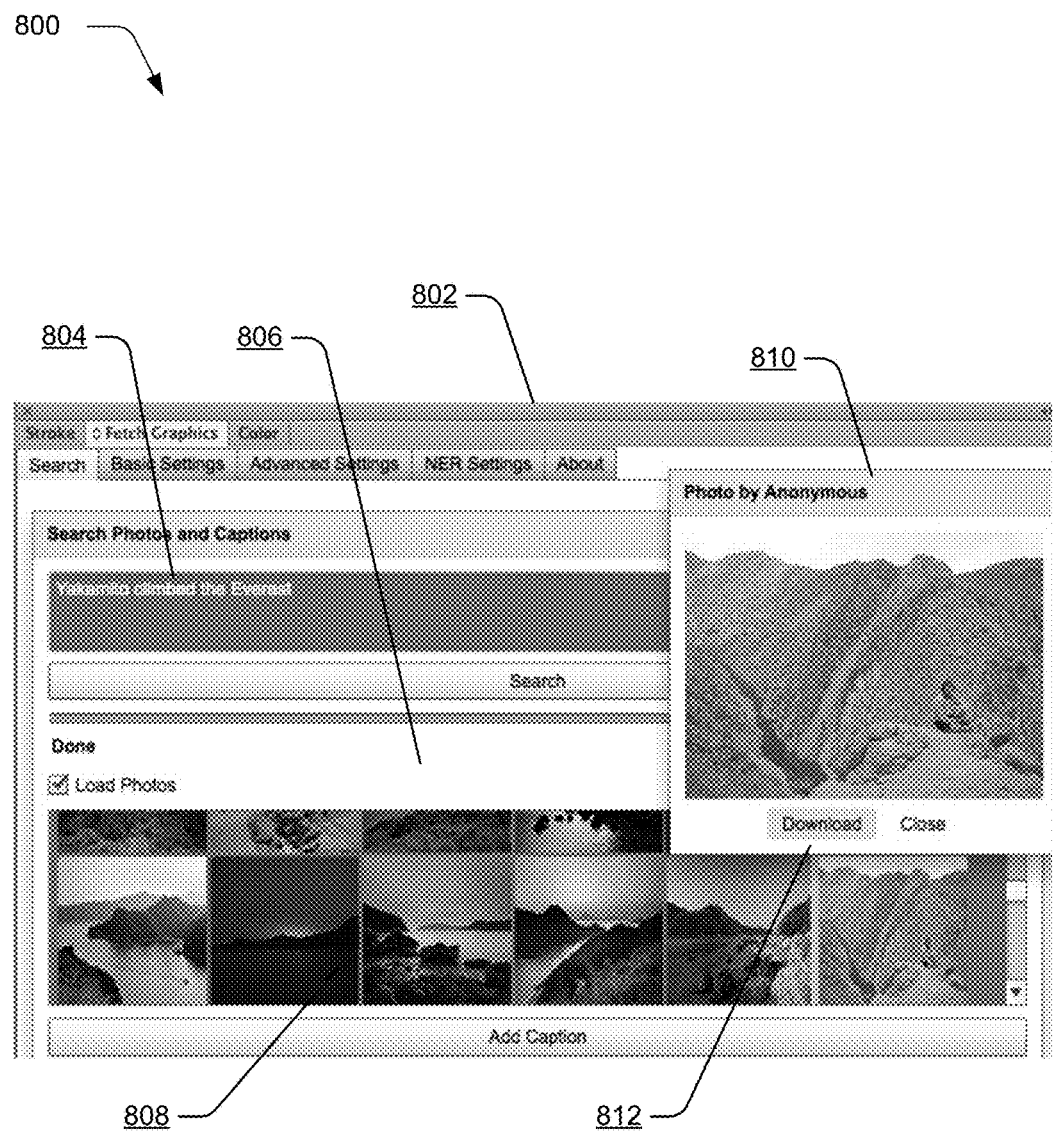
FIG. 8 is a diagram depicting an example user interface that enables stock image searches in accordance with one or more implementations.

FIG. 8 is a diagram depicting generally at 800 an example user interface 802 that enables stock image searches in accordance with one or more implementation. In this example, the user interface 802 include a search input control 804 in which search terms can be input. In accordance with techniques described herein, the search terms may be automatically generated using a theme phrase(s) for content determined by operation of an image search tool 110. In this case, the image search tool 110 is configured to cause input of the theme phrase(s) into the search input control 804 to initiate a corresponding search. The search input control 804 may also be configured to accept manual input of terms by a user, as well as modification of terms and queries that are input automatically via the image search tool 110.

The user interface 802 includes an image results portion 806 in which a collection 808 of images returned as results of a search is exposed. The collection 808 can be arranged in various ways to enable viewing, browsing, and selection of images. In this example, the collection 808 is configured as a group of navigable thumbnails for relevant images. The user interface 802 can additionally provide an image detail element 810, such as a pop-up frame (as depicted) or detail region that provides an expanded view of a selected image. The image detail element 810 can also be configured to provide additional information regarding an image including the image source, usage rights, image metadata, and other details that can assist a user in choosing images. Further, a control 812 can be provided to select the image and cause download and insertion of the image into a document, such as the example download button depicted with the image in the image detail element 810, or another comparable selection instrumentality.

Figure 9:
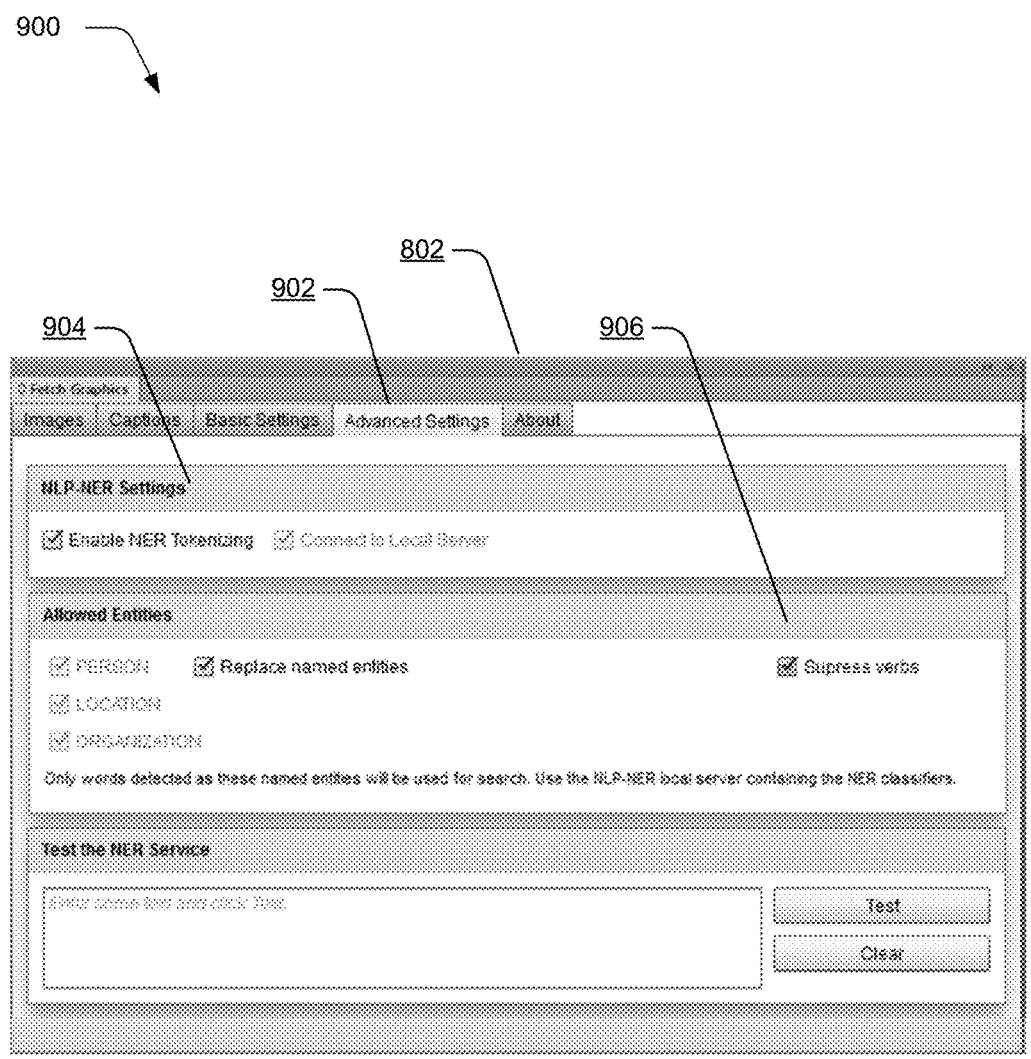
FIG. 9 is a diagram depicting an example user interface having functionality to control settings for stock image searches in accordance with one or more implementations.

FIG. 9 is a diagram depicting generally at 900 another example user interface having functionality to control settings for stock image searches in accordance with one or more implementations. In particular, a settings tab 902 for the user interface 802 of FIG. 8 is represented. The settings tab 902 can be configured to provide various settings to control stock image searches, including settings for named entity recognition and theme phrase derivation. Various different controls can be employed to implement settings such as toggle buttons, slider controls, check boxes, input boxes and the like. In this example, the settings tab 902 includes a toggle control 902 that is operable to turn named entity recognition (NER) on or off Here, the toggle control 902 is implemented as a checkbox that is represented as being selected to "Enable NER Tokenizing." Consequently, named entity recognition and categorization to derive expanded queries as discussed in this document are set to occur. If desired, the NER feature can be turned off by deselecting the checkbox or through a comparable toggle control. Additionally, when the NER feature is turned on, allowed entity settings 906 can be provided to enable a user to specify whether named entities are replaced with generalized terms and also to make individual selections regarding the types of entities (e.g., person, location, organization) for which named entity recognition is activated.

Figure 10:
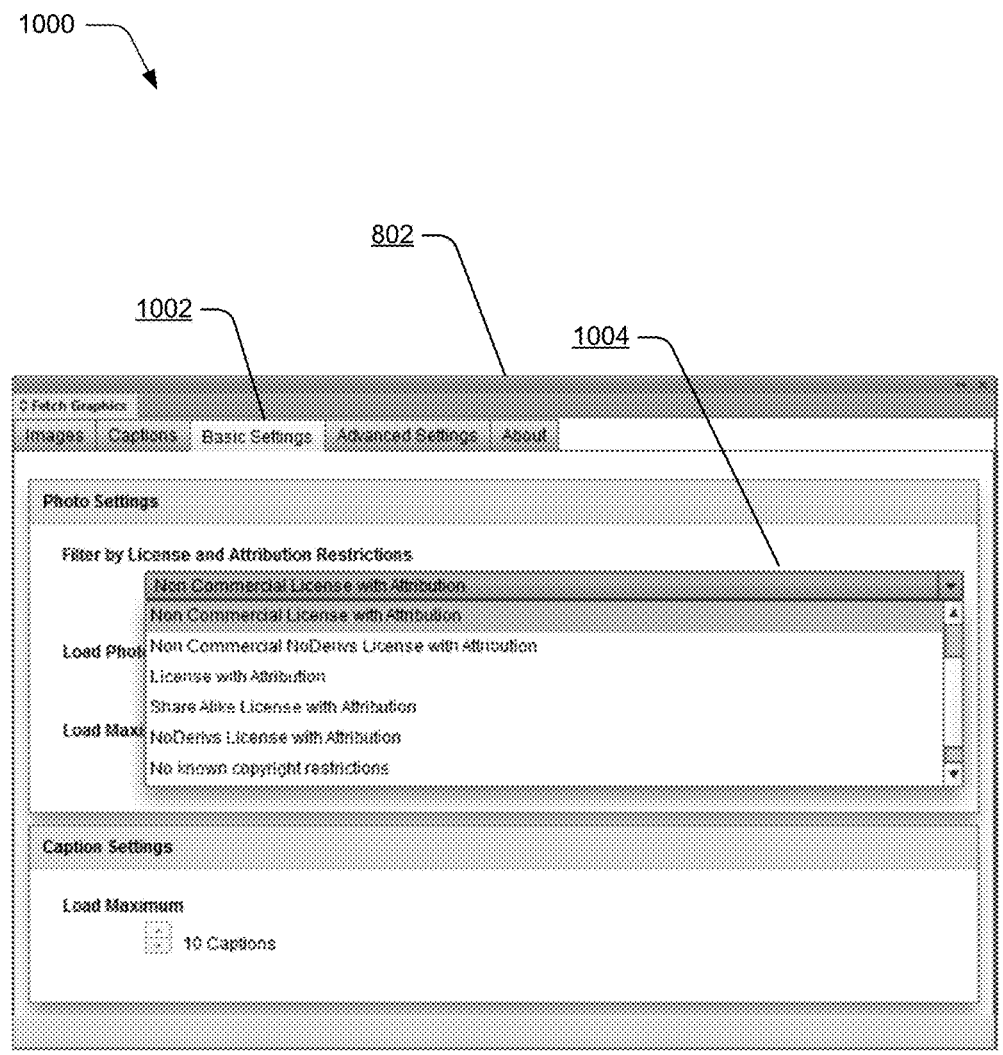
FIG. 10 is a diagram depicting an example user interface that exposes functionality to enable filtering of stock image search results in accordance with one or more implementations.

FIG. 10 is a diagram depicting generally at 1000 another example user interface that exposes functionality to enable filtering of stock image search results in accordance with one or more implementations. In particular, an image settings tab 1002 for the user interface 802 of FIG. 8 is represented. The image settings tab 1002 includes a filter control 1004 in the form of a list box that enables selections related to filtering of image results according to usage rights. As noted previously, usage rights can include attribution conditions, licensing terms, costs, and other conditions associated with image usage. Additionally, the filter control 1004 is provided to enable filtering based on various usage right options. For example, the filter control 1004 use can expose options for filtering of image results such as options to show images having "Non Commercial License with Attribution," "Share Alike License with Attribution," and "No know copyright restrictions", to name a few examples. Selection of particular usage rights criteria causes images that are exposed (such as via the image results portion 806 of FIG. 8) to be filtered accordingly.

To assist user in image selection, usage rights information can also be exposed with a user interface 802 along with display of corresponding images. In an implementation, images can be grouped according to usage rights. Moreover, a grouping control can be provided that is operable to selectively turn grouping by usage rights on and off and thereby enable a user to toggle between grouped and ungrouped views.

Although the filter control 1004 is represented as being provided via the image settings tab 1002, a comparable filter control may also be provided as a control within a page of image results. For example, selectable filter buttons for one or more types of usage rights can be exposed along with images presented via an image results portion 806 as in FIG. 8. The filter buttons enable quick access to and switching between different filtered views of image results. Accordingly, various different controls and options to enable grouping and filtering of image results based on usage right are contemplated, including but not limited to the examples enumerated herein.

Having described example procedures and details in accordance with one or more implementations, consider now a discussion of example systems and devices that can be utilized to implement the various techniques described herein.

Example System and Device

Figure 11:
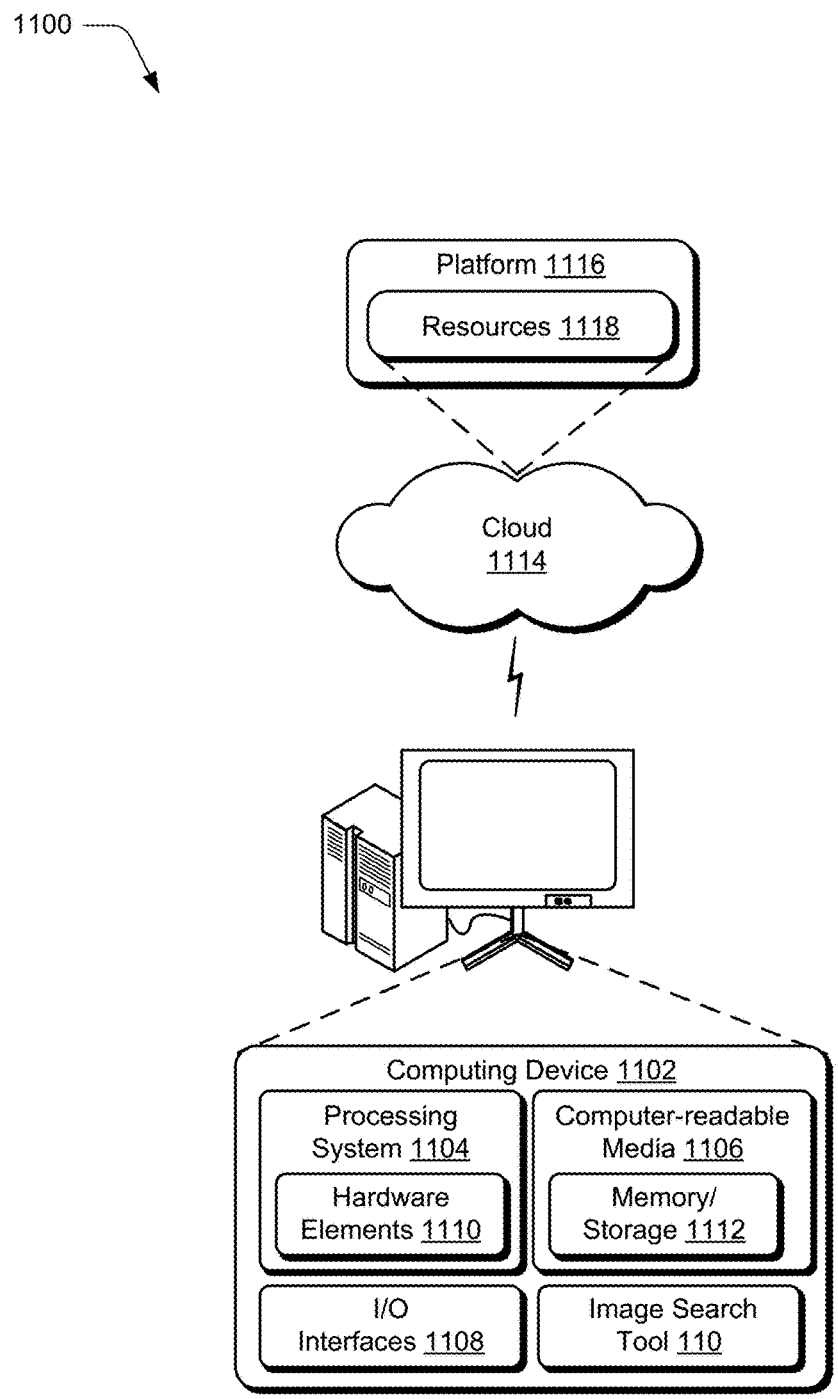
FIG. 11 illustrates an example system including various components of an example device that can be employed for one or more implementations of extrapolative stock image searches described herein.

FIG. 11 illustrates an example system generally at 1100 that includes an example computing device 1102 that is representative of one or more computing systems and/or devices that may implement the various techniques described herein. This is illustrated through inclusion of the image search tool 110, which operates as described above. The computing device 1102 may be, for example, a server of a service provider, a device associated with a client (e.g., a client device), an on-chip system, and/or any other suitable computing device or computing system.

The example computing device 1102 is illustrated as including a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also serve to abstract scaling of resources to provide a corresponding level of scale to encountered demand for the resources 1118 that are implemented via the platform 1116. Accordingly, in an interconnected device embodiment, implementation of functionality described herein may be distributed throughout the system 1100. For example, the functionality may be implemented in part on the computing device 1102 as well as via the platform 1116 that abstracts the functionality of the cloud 1114.

CONCLUSION

Although techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. A computing device comprising:
a processing system;
one or more computer readable media storing instructions executable via the processing system to cause the computing device to perform operations to derive theme phrases corresponding to selected text of a document for use in a search including:
identifying, by the computing device, text of the document to utilize for theme derivation in connection with insertion of a stock image at a position within the document that corresponds to the text;
forming, by the computing device, a phrase array for the text by separating the text into constituent phrases;
generating, by the computing device, a hashmap of words contained in the text that maps different words to relevance values derived for the different words;
recognizing, by the computing device, a set of documents that are similar to the document based on comparison of the phrase array and hashmap for the document to phrase arrays and hashmaps computed for documents included in an established source collection;
producing, by the computing device, an array of dominant words that are similar across the document and the set of documents by:
sorting, by the computing device, elements of the hashmap for the document and the hashmaps computed for the documents included in the established source collection according to the relevance values; and
populating, by the computing device, the array of dominant words with top-ranked elements of the hashmap and the hashmaps according to the sorting until a defined threshold number of words have been added to the array of dominant words;
establishing, by the computing device, dominant phrases having words included in the array of dominant words as theme phrase candidates for the text; and
utilizing, by the computing device, one or more of the dominant phrases as theme phrases for a search to obtain suggested images for insertion at the position within the document.

2. The computing device as described in claim 1, wherein the established source collection comprises documents contained within at least one of the same domain as the document or one or more external domains designated as having content that is similar to the document.

3. The computing device as described in claim 1, wherein the instructions are executable via the processing system to cause the computing device to perform further operations including:
extracting keywords that are contained in the one or more dominant phrases to use for the search;
expanding the keywords by categorization of name entities recognized from the keywords; and
building query strings from the expanded keywords to use for the search including constructing query strings based on combinations of keywords extracted from the text and corresponding generalized terms obtained by expanding the keywords.

4. The computing device as described in claim 1, further comprising conducting the search by accessing and searching images contained in an image database exposed via an image service accessible via a service provider.

5. The computing device as described in claim 1, further comprising conducting the search by searching images across multiple different image sources.

6. The computing device as described in claim 1, further comprising outputting an image selection user interface having an arrangement of the suggested images obtained from the search.

7. The computing device as described in claim 6, wherein the image selection user interface includes filter functionality operable to filter the arrangement of the suggested images based on usage rights associated with the suggested images.

8. The computing device as described in claim 6, wherein the image selection user interface includes functionality operable to select and automatically insert one of the suggested images at the position within the document.

9. A method implemented by a computing device comprising:
- identifying, by the computing device, text of a document to utilize for theme derivation in connection with insertion of a stock image at a position within the document that corresponds to the text;
- forming, by the computing device, a phrase array for the text by separating the text into constituent phrases;
- generating, by the computing device, a hashmap of words contained in the text that maps different words to relevance values derived for the different words;
- recognizing, by the computing device, a set of documents that are similar to the document based on comparison of the phrase array and hashmap for the document to phrase arrays and hashmaps computed for documents included in an established source collection;
- producing, by the computing device, an array of dominant words that are similar across the document and the set of documents by:
  - sorting, by the computing device, elements of the hashmap for the document and the hashmaps computed for the documents included in the established source collection according to the relevance values; and
  - populating, by the computing device, the array of dominant words with top-ranked elements of the hashmap and the hashmaps according to the sorting until a defined threshold number of words have been added to the array of dominant words;
- establishing, by the computing device, dominant phrases having words included in the array of dominant words as theme phrase candidates for the text; and
- utilizing, by the computing device, one or more of the dominant phrases as theme phrases for a search to obtain suggested images for insertion at the position within the document.

10. The method as described in claim 9, further comprising:
- extracting keywords that are contained in the one or more dominant phrases;
- expanding the keywords by categorization of name entities recognized from the keywords; and
- building query strings from the expanded keywords to use for the search based on combinations of the keywords and corresponding generalized terms obtained from the expanded keywords.

11. The method as described in claim 10, further comprising lemmatizing verbs contained in the keywords, wherein the query strings are constructed using the lemmatized verbs.

12. The method as described in claim 9, further comprising:
- breaking at least one of the theme phrases into parts of speech (POS); and
- identifying named entities for subjects and objects indicated by the parts of speech (POS).

13. The method as described in claim 9, wherein at least one of the theme phrases comprises an existing topic phrase associated with the text.

14. The method as described in claim 9, wherein at least one of the theme phrases is derived from the text responsive to a determination that an existing topic phrase associated with the text is unavailable.

15. The method as described in claim 9, further comprising conducting the search by searching images across multiple different image sources.

16. The method as described in claim 9, further comprising outputting an image selection user interface having an arrangement of the suggested images obtained from the search.

17. One or more computer-readable storage media comprising instructions stored thereon that, responsive to execution by a computing device, cause the computing device to derive theme phrases corresponding to selected text of a document for use in a search including:
- identifying, by the computing device, text of the document to utilize for theme derivation in connection with insertion of a stock image at a position within the document that corresponds to the text;
- forming, by the computing device, a phrase array for the text by separating the text into constituent phrases;
- generating, by the computing device, a hashmap of words contained in the text that maps different words to relevance values derived for the different words;
- recognizing, by the computing device, a set of documents that are similar to the document based on comparison of the phrase array and hashmap for the document to phrase arrays and hashmaps computed for documents included in an established source collection;
- producing, by the computing device, an array of dominant words that are similar across the document and the set of documents by:
  - sorting, by the computing device, elements of the hashmap for the document and the hashmaps computed for the documents included in the established source collection according to the relevance values; and
  - populating, by the computing device, the array of dominant words with top-ranked elements of the hashmap and the hashmaps according to the sorting until a defined threshold number of words have been added to the array of dominant words;
- establishing, by the computing device, dominant phrases having words included in the array of dominant words as theme phrase candidates for the text; and
- utilizing, by the computing device, one or more of the dominant phrases as theme phrases for a search to obtain suggested images for insertion at the position within the document.

18. The one or more computer-readable storage media as described in claim 17, further comprising conducting the search by accessing and searching images contained in an image database exposed via an image service accessible via a service provider.

19. The one or more computer-readable storage media as described in claim 17, further comprising conducting the search by searching images across multiple different image sources.

20. The one or more computer-readable storage media as described in claim 17, further comprising outputting an image selection user interface having an arrangement of the suggested images obtained from the search, the image selection user interface including:
- filter functionality operable to filter the arrangement of the suggested images based on usage rights associated with the suggested images; and
- functionality operable to select and automatically insert one of the suggested images at the position within the document.

* * * * *